(12) United States Patent
Iwane

(10) Patent No.: US 6,757,077 B1
(45) Date of Patent: Jun. 29, 2004

(54) THREE-DIMENSIONAL IMAGE MAKING APPARATUS FOR FORMING A RELIEF CONFIGURATION OF AN OBJECT

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/568,177

(22) Filed: May 9, 2000

(51) Int. Cl.[7] ............ H04N 1/40; H04N 1/23; G06K 15/02; B32B 3/00

(52) U.S. Cl. ............ 358/1.9; 358/3.27; 428/221; 430/14

(58) Field of Search .......... 358/1.9, 2.1, 3.27, 358/1.18, 503, 450, 464; 382/106, 154; 347/171, 172; 428/542.2, 221; 345/419; 430/14

(56) References Cited

U.S. PATENT DOCUMENTS 6,031,941 A * 2/2000 Yano et al. ............ 382/154

2003/0157356 A1 * 8/2003 Tamura et al. ............ 428/542.2
2004/0036922 A1 * 2/2004 Yamada et al. ............ 358/3.21

FOREIGN PATENT DOCUMENTS

JP 53-111367 * 9/1978 ............ B29D/27/00

* cited by examiner

Primary Examiner—Scott Rogers

(57) ABSTRACT

A three-dimensional image making apparatus according to the present invention comprises: an image input device configured to obtain image information of the object; an object distance processing device configured to obtain object distance information of the object; a printer configured to print an object image of the object and to form a relief configuration of the object; and an information-processing device configured to control the printer to print the object image based upon the image information and to form the relief configuration, superimposed on the object image, based upon the object distance information.

19 Claims, 13 Drawing Sheets

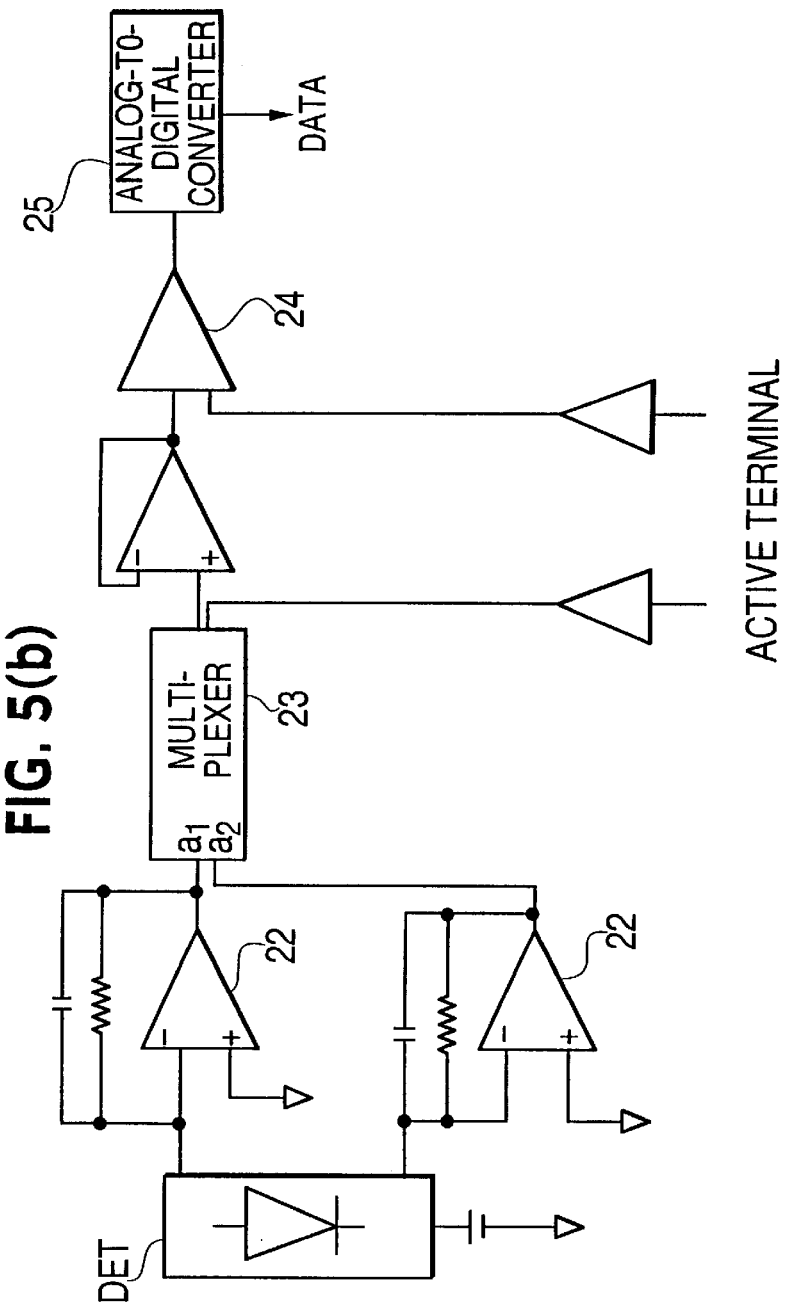

VERTICAL SCANNING SIGNAL WITH GALVANO-MIRROR GM

SYNCHRONIZING SIGNAL IN RETURNING PERIOD

HORIZONTAL SCANNING SIGNAL WITH POLYORAL MIRROR PM

HORIZONTAL SCANNING SIGNAL WITH POLYGONAL MIRROR PM

SYNCHRONIZING SIGNAL IN RETURNING PERIOD

LED-ON/OFF

A/D CONVERSION WITH SAMPLE &HOLD CIRCUIT

LS(DET)

MULTIPLEXER

SAMPLE & HOLD CIRCUIT

A/D CONVERTER START TIMING

DATA

THREE-DIMENSIONAL IMAGE MAKING APPARATUS FOR FORMING A RELIEF CONFIGURATION OF AN OBJECT

BACKGROUND OF THE INVENTION

1. Field of the Invention

The present invention relates to a three-dimensional image making apparatus. More specifically, the present invention relates to a three-dimensional image making apparatus for printing an object image and for forming a relief configuration of the object image on a printing material.

2. Description of the Related Art

Apparatuses and methods for measuring and reproducing three-dimensional objects are well known. Examples of such apparatuses and methods include auto-focussing devices (AF device), three-coordinate measuring machines, holographic imaging devices, and stereo photography.

An AF device is able to measure an object distance automatically and enables a camera to focus on a film surface automatically. Generally, AF devices measure the object distance for a typical single point on a three-dimensional object. In the strict sense, AF devices do not reproduce three-dimensional images of objects. Although some AF device measure object distances for several points on an object, the fundamental idea of auto-focusing art is to measure the object distance for a single point on an object.

Three-coordinate measuring machines of contact measurement type can measure x, y and z coordinate positions at every point on an object. These machines typically use a contact-type micrometer. A three-coordinate measuring machine of contact measurement type traces the surface of an object with the contact-type micrometer and inputs x, y and z coordinate data into a computer. From the coordinate data, a three-dimensional image may be displayed on some sort of display device.

However, generally, tracing the surface of an object with a contact-type micrometer must be performed manually because objects can have various shapes and auto tracing of such objects is difficult. Furthermore, in order to measure a three-dimensional object precisely with a three-coordinate measuring machine, it is necessary to trace the entire object surface in detail.

A holographic imaging device can form a three-dimensional image of an object. Holographic imaging devices use a coherent light source of which luminous flux is divided into two steams of luminous flux. One stream of luminous flux is applied to the object to be imaged and is reflected from the object as object waves. The second stream of luminous flux is used as a reference light for holography. By interfering these two streams of luminous flux, interference fringes are generated. The interference fringes can be recorded as a hologram on a high-resolution photographic material such as a photographic plate.

The hologram recorded on the photographic plate functions as a kind of diffraction grating. When the reference light is applied to the hologram, object waves are reproduced, resulting in a three-dimensional object image as if the object actually exists within the hologram. Thus, the holographic imaging device can record three-dimensional information directly because the hologram itself includes three-dimensional data. However, it is another matter whether three-dimensional data in the hologram is usable or practical.

The above-mentioned conventional apparatuses for measuring three-dimensional objects are not without their problems. For example, AF devices and three-coordinate measuring machines process three-dimensional information with a computer and display three-dimensional images on a device such as a monitor display. A three-dimensional image displayed on a monitor display is expressed as a perspective drawing that is viewed from a specific direction or as a drawing depicted in contour lines of the object displayed. However, the perspective drawing or the drawing depicted in contour lines is not strictly a three-dimensional drawing, but instead is a two-dimensional drawing only similar to a three-dimensional image. The perspective drawing or the drawing depicted in contour lines does not recreate reality of a three-dimensional object. And, a second problem with using a monitor display to display the image is that monitor displays lack portability.

A holographic recording medium, such as a photographic plate, does have portability. However, holography also has some problems. For example, when a hologram is recorded onto a photographic plate, any object movement whatsoever, no matter how slight, will reduce the quality of the recorded image significantly. Furthermore, holography is not very practical because reproducing a holographic image is conditioned on the light source at the time of reproduction, and without a proper light source, reproduction will be poor. Also, a holographic image is the same size as the object that it was based upon. Moreover, reproducing an image in color causes difficulty in the manufacturing and reproduction of holograms.

Meanwhile, conventional stereo photography, which has been used since the days of the daguerreotype camera, is known as an art of re-creating the reality of a three-dimensional object. In the stereo photography, by using two cameras positioned laterally a predetermined distance apart, two pictures of the same object are taken. A three-dimensional, stereo image of the object can be formed by viewing the two pictures in a manner that observer's right and left eye observe corresponding right and left picture. Stereo photography is an excellent method of making and viewing three-dimensional images because people can perceive real three-dimensional configuration by using the stereoscopic vision that a human being possesses naturally.

Furthermore, the two pictures necessary to produce a stereo photography can be easily generated with a computer based upon object image data, such as object distance and three-coordinate data obtained by a three-coordinate measuring machine or by an AF device. Stereo photography is not without its problems either.

For instance, viewing two pictures to form a stereo image requires considerable skill and concentration because each eye must concentrate on each picture independently. Also, it takes a considerable amount of time to form a three-dimensional image in observer's brain. And, eye positioning for viewing the two pictures must be accurate or a stereo image cannot be formed.

Another major problem with stereo photography is that only one person can view a stereo image at a time, and a group of people cannot share in the viewing of a photograph at the same time, like is possible with conventional photography.

SUMMARY OF THE INVENTION

It is an object of the present invention to overcome the above-mentioned problems of conventional three-dimensional image making apparatuses.

It is another object of the present invention to provide a three-dimensional image making apparatus that can easily form a three-dimensional image with reality on a recording medium and can form a three-dimensional image that a plurality of persons can view at the same time.

It is another object of the present invention to provide a portable and easily manufacturable recording medium on which three-dimensional image can be easily formed.

Objects and advantages of the present invention are achieved in accordance with embodiments of the present invention with a three-dimensional image making apparatus, including: an image input device configured to obtain image information of the object; an object distance processing device to obtain object distance information and an object distance of the object; a printer configured to print an object image of the object and to form a relief configuration of the object; and an information-processing device configured to control the printer to print the object image based upon the image information and to form the relief configuration, superimposed on the object image, based upon the object distance information.

In accordance with embodiments of the present invention, the information processing device may compress the object distance information so that compression rate of the object distance information is increased as the object distance increases, and controls the printer to form the relief configuration based upon the compressed object distance information.

In accordance with embodiments of the present invention, the object distance processing device may obtain object distance information relating to object distance at each pixel of the image, and the information processing device may process the object distance information at each pixel so that the relief configuration is emphasized according to spatial frequency at the pixel, and control the printer to form the relief configuration based upon the processed object distance information.

In accordance with embodiments of the present invention, the information processing device may process the object distance information at each pixel so that the relief configuration is emphasized according to a spatial frequency at the pixel, and controls the printer to form the relief configuration based upon the processed object distance information.

Objects and advantages of the present invention are achieved in accordance with embodiments of the present invention with a printing material, including: a substrate layer; a blister ink layer being blistered by applying light or heat, the blister ink layer forming the relief configuration according to applied quantity of light or heat; and a printing layer on which the image is printed, wherein the substrate layer, the blister ink layer and the printing layer are piled up in turn.

Objects and advantages of the present invention are achieved in accordance with embodiments of the present invention with a printing material, including: a substrate layer; a blister ink layer, which has been already blistered, being shrunk by applying light or heat, the blister ink layer forming relief configuration according to applied quantity of light or heat; and a printing layer on which the image is printed, wherein the substrate layer, the blistered ink layer and the printing layer are piled up in turn.

In accordance with embodiments of the present invention, the printer includes a device to print the image, on said printing layer, and a device to form the relief configuration by blistering or shrinking the blistered ink layer through applying light or heat, and the information-processing device, controls the printer to superimpose the relief configuration on the object image, based upon the object distance information obtained by the object distance processing device.

In accordance with embodiments of the present invention, the printer includes a printing device for printing an image and a relief-forming device for forming relief configuration, independently.

BRIEF DESCRIPTION OF THE DRAWING FIGURES

These and other objects and advantages of the present invention will become apparent and more readily appreciated from the following description of the preferred embodiments, taken in conjunction with the accompanying drawings of which:

FIG. 5 is a circuit diagram illustrating the circuit of signal processing circuit CKT2 shown in FIG. 4;

DETAILED DESCRIPTION OF THE PREFERRED EMBODIMENTS

Reference will now be made in detail to the preferred embodiments of the present invention, examples of which are illustrated in the accompanying drawings, wherein like reference numbers refer to like elements throughout.

Figure 1:
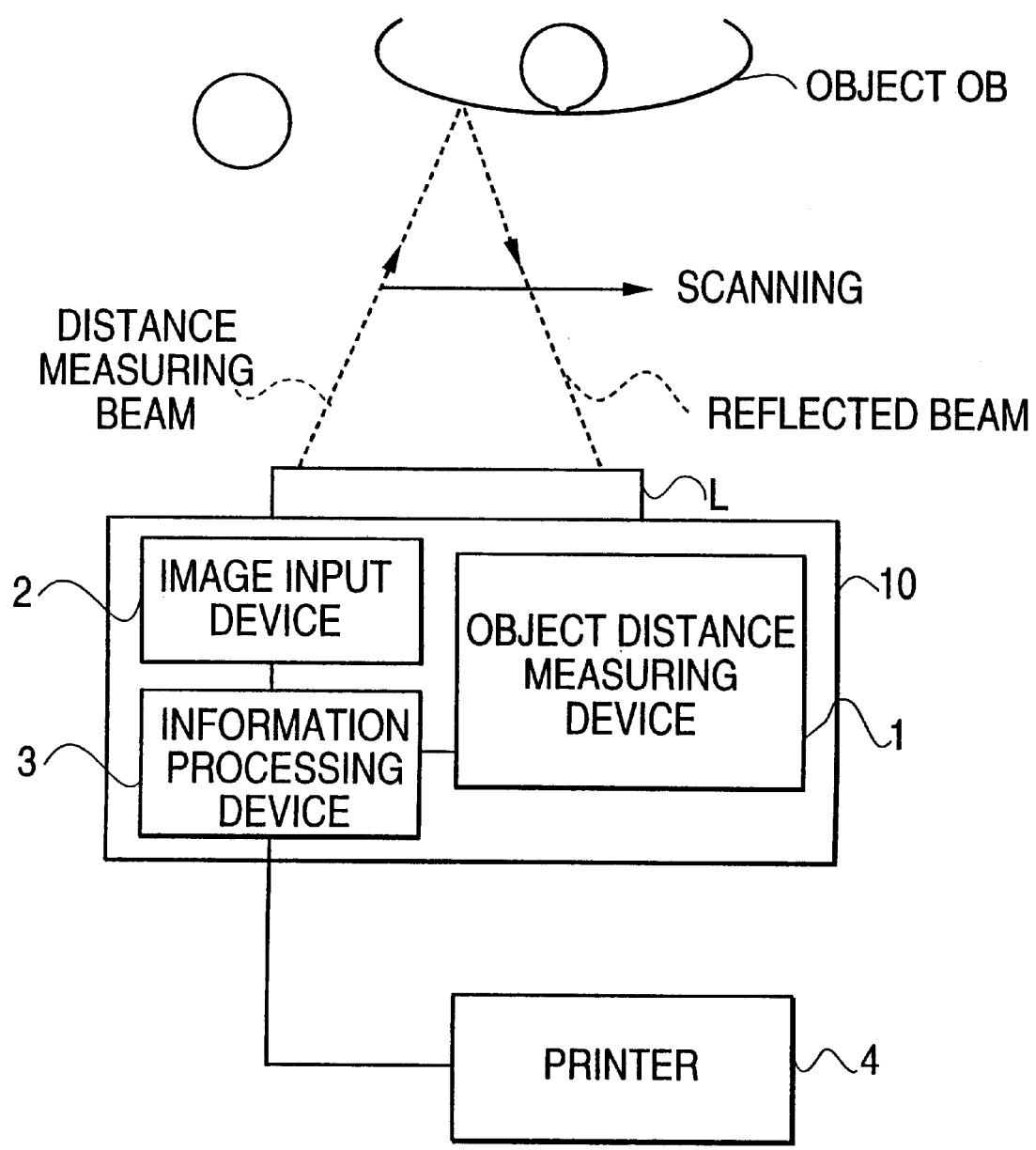
FIG. 1 is a block diagram illustrating in outline a three-dimensional image making apparatus in accordance with embodiments of the present invention.

FIG. 1 is a block diagram illustrating in outline a three-dimensional image making apparatus in accordance with embodiments of the present invention. A three-dimensional image making apparatus comprises an object information measuring device 10 that obtains image information relating to an object OB, and a printer 4 that forms a three-dimensional image based upon the obtained information.

The object information measuring device 10 includes an object distance measuring device 1 measuring a distance from a camera to each part of object OB (hereafter, the distance from the camera to each part of object OB is called object distance, and information relating to the distance from the camera to each part of the object OB is called object distance information), an image input device 2 obtaining image information of object OB, and an information-processing device 3 processing the image information and the distance information of object OB. A printer 4 is detachably connected to the object information measuring device 10 through a data-communication cable and a connector. After information-processing device 3 processes image information and object distance information at each point of the object OB, the printer forms a three-dimensional image of the object OB, based upon the image information and the object distance information at each point of the object OB. The object distance measuring device 1 obtains the object distance at each point on the object, based upon information that is provided through an imaging optical system L. The imaging optical system L includes a distance measuring system using the so-called "active method," which adopts the triangulation principle. In the imaging optical system L, a light beam from a projection light source LS is projected to the object OB and is then reflected from the object OB. The reflected light beam goes back through the imaging optical system L and is received by a light-receiving element DET.

Figure 2:
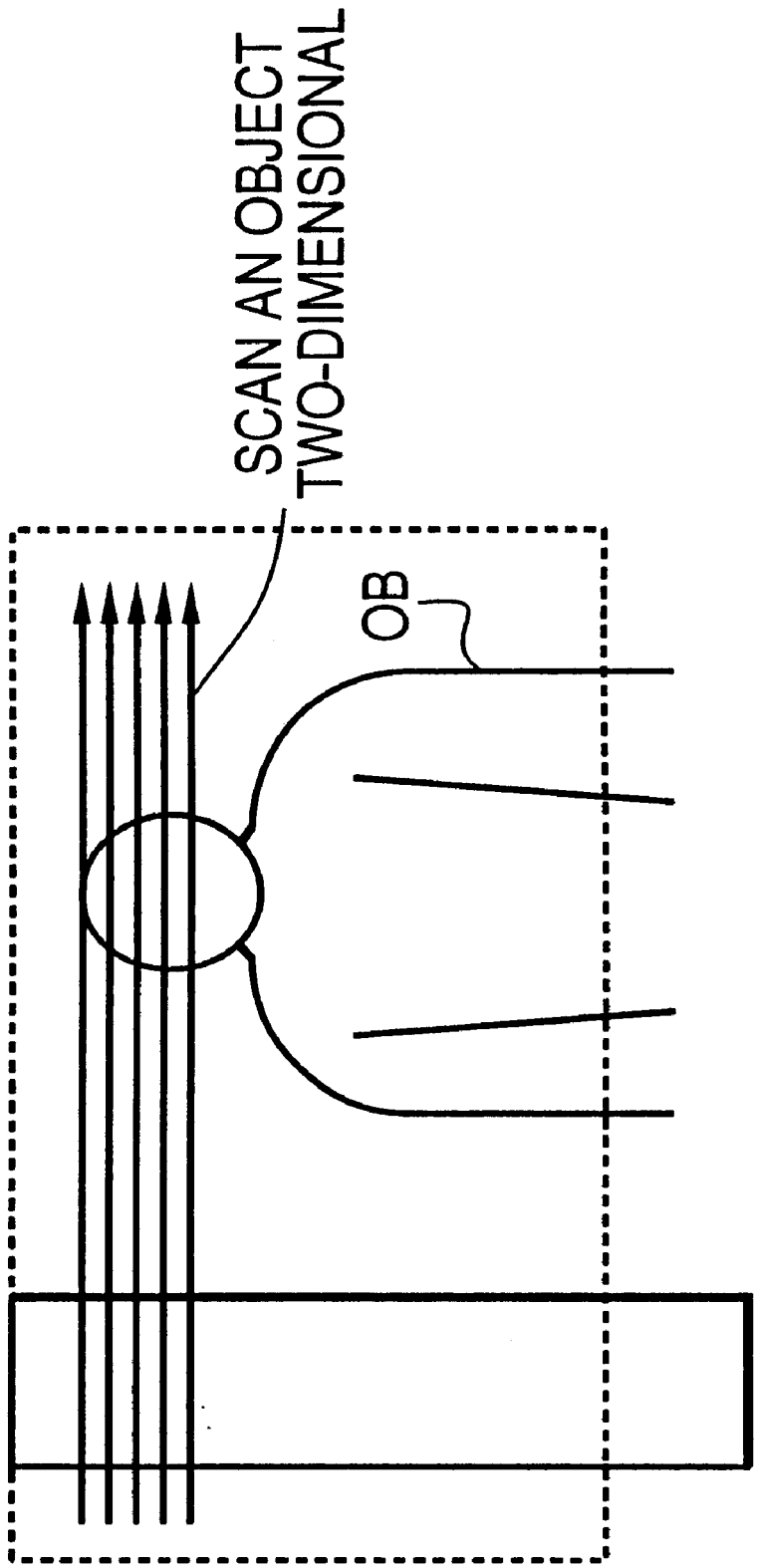
FIG. 2 is a view illustrating how to scan the object OB to measure the object distance at each point on the object.

FIG. 2 is a view illustrating how to scan the object OB to measure the object distance at each point on the object. Object information measuring device 10 drives object distance measuring device 1 so that the object OB is scanned horizontally and vertically through an optical scanning system. The optical scanning is performed over a whole picture frame, obtaining distance data. During scanning, the object information measuring device 10 obtains distance data in a fixed time interval so that each position at which each distance data is obtained accords to each position at which the two-dimensional image data is obtained. That is, distance data at each point on the object correlates with two-dimensional image data at the same point.

Figure 3:
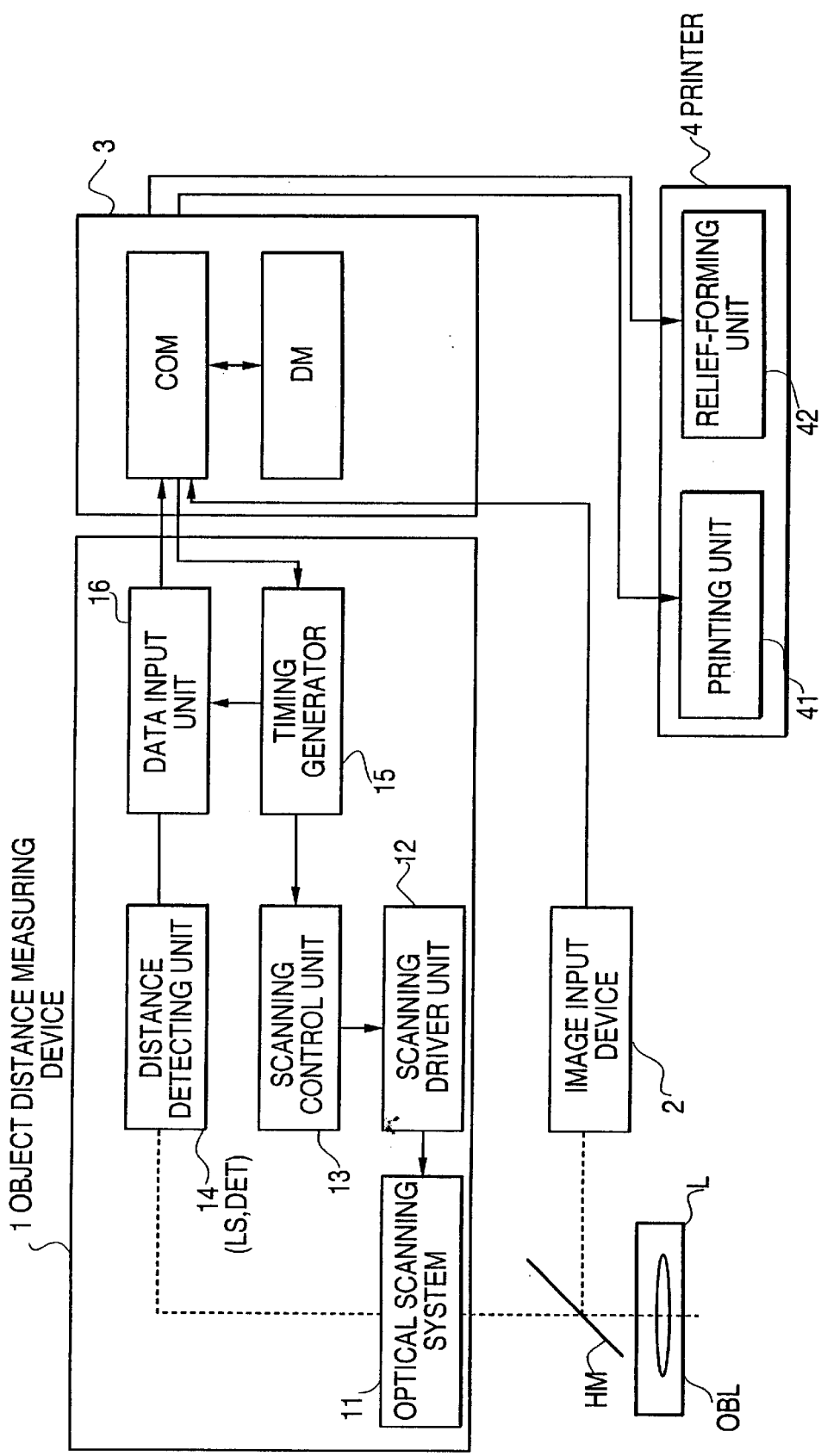
FIG. 3 is a block diagram illustrating object information measuring device 10 and printer 4 shown in FIG. 1.

FIG. 3 is a block diagram illustrating object information measuring device 10 and printer 4 in detail. An Object distance measuring device 1 comprises an optical scanning system 11 through which a light beam for measuring distance is swept horizontally and vertically, a scanning driver unit 12 which drives the optical scanning system 11, a scanning control unit 13 which controls the scanning driver unit 12, a distance-detecting unit 14 which includes a projecting light source LS and a light-receiving element DET which receives reflected light beam from object OB, a timing generator 15 which generates timing signal for optical scanning, and a data input unit 16 which receives distance data output from the distance-detecting unit 14 responsive to the timing signal generated by a timing generator 15.

Image input device 2, which is described later in detail, includes an imaging element which outputs a signal converted -from light, corresponding to a two-dimensional image of the object OB formed on an image plane in imaging optical system L, and a circuit which drives the imaging element and takes out image data. When the image input device 2 detects the image data, it is possible to focus on the object OB automatically based upon output from object distance measuring device 1.

Information-processing device 3 includes an information-processing computer COM that processes object distance data and image data through predetermined arithmetic process, after receiving the object distance data output from the data input unit 16 and the image data output from the image input device 2. The information-processing device 3 also includes a data-storing device DM that stores roughness data, which is the processed object distance data, and printing data, which is processed image data.

Printer 4 includes a printing unit 41 that prints two-dimensional images on a printing material including blister ink, based upon the printing data output from the information-processing device 3. The printer 4 also includes a relief-forming unit 42 that forms a relief configuration by blistering blister ink based upon the roughness data output from the information-processing device 3.

Figure 4:
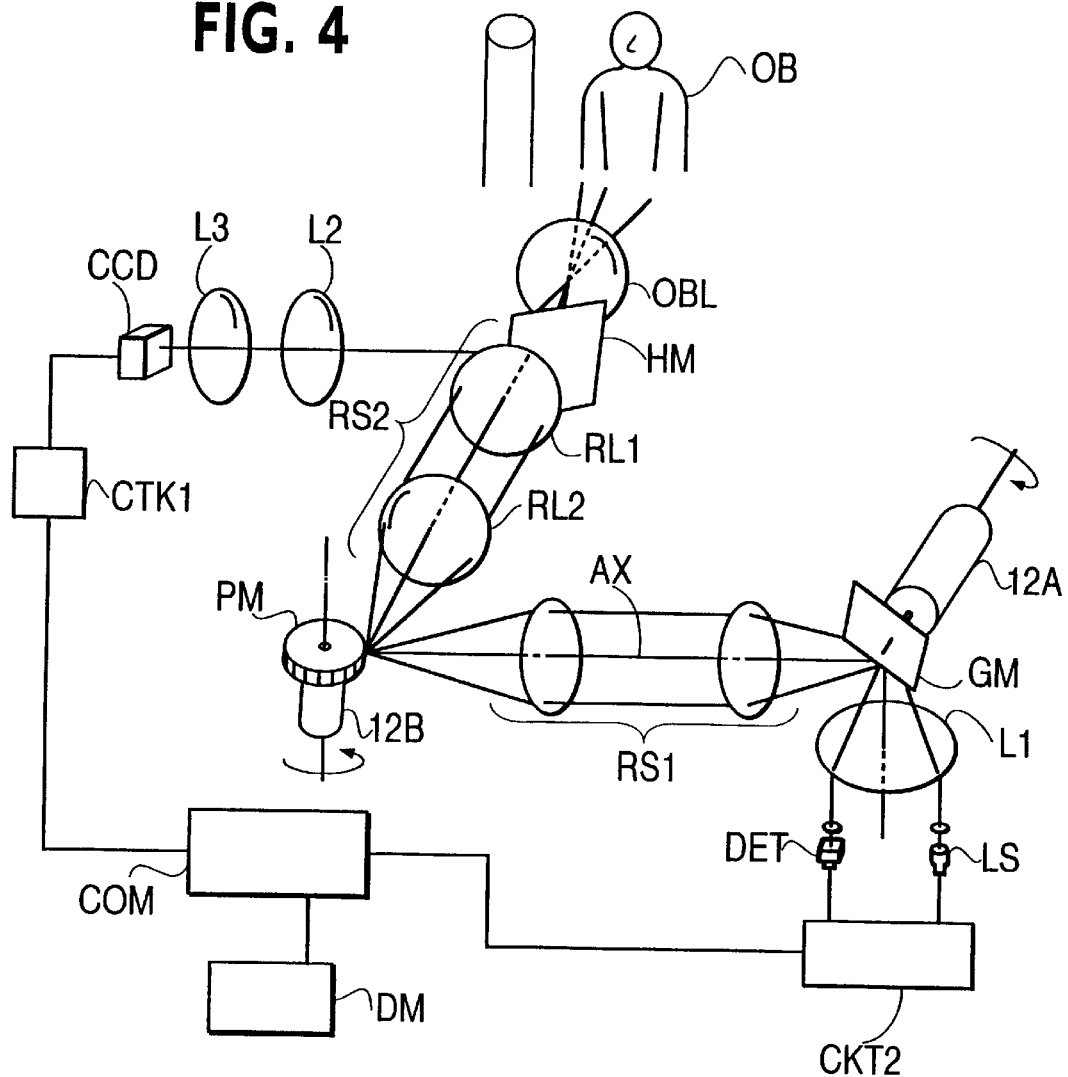
FIG. 4 is a view illustrating a structure of optical scanning system 11 of the object information measuring device 10 shown in FIG. 1.

FIG. 4 is a view illustrating a structure of optical scanning system 11 of the object information measuring device 10 according to a preferred embodiment of the present invention. In particular, a light beam of a projection light source LS is projected to the object OB through a scanning optical system 11 having an optical axis AX, and is reflected from the object OB. The scanning optical system 11 includes lens L1, first relay optical system RS1, second relay optical system RS2, and objective lens OBL. The light beam reflected from the object OB goes back through the scanning optical system 11 and reaches the light-receiving element DET. The light-receiving element DET outputs a positional signal that relates to a position of the light beam on the light-receiving element DET. An angle of the light beam reflected from the object OB is calculated based upon the positional signal of the light-receiving element DET, and the object distance is calculated from the calculated reflected angle of the light beam.

The object distance is calculated according to the triangle principle, which is widely applied to a camera such as a 35-mm compact camera. The angle of the light beam reflected from the object OB corresponds to a distance between an original position and a moved position of the light beam on the light-receiving element DET, which is an analog position sensor. A light beam emitted from the projection light source LS, which is located a predetermined distance apart from the optical axis AX, focuses on a point on the optical axis AX, the point also located on a galvano-mirror GM of the optical scanning system 11. The light beam is swept one-dimensionally by changing the direction of the galvano-mirror GM. The scanning driver 12a that drives the galvano-mirror GM is controlled through servo-control according to voltage applied to the scanning driver 12a, changing the direction of the galvano-mirror GM. Angular position of the galvano-mirror GM is adjusted by the scanning driver 12a based upon signals generated by the scanning control unit 13 according to timing signals generated by a timing generator 15 shown in FIG. 3. The light beam reflected by the galvano-mirror GM passes through the first relay optical system RS I and reaches a polygonal mirror PM that is located in a conjugate position with the galvano-mirror GM, and then, the light beam is reflected by the polygonal mirror PM.

The polygonal mirror PM is a polygon having multiple reflection mirrors on the sides. Each of the reflection mirrors is attached to each side of the polygon. The light beam reflected by each reflection mirror is swept from a starting position to an ending position. As the light beam sweeps, an angle of the light beam relative to the starting position increases at a fixed speed until the light beam reaches the ending position. At this time, the current reflection mirror is abruptly switched to the next reflection mirror, and the light beam again begins to be swept from the starting position at a fixed speed, repeating same motion. Thus, the light beam reflected by polygonal mirror PM trails like a triangular wave. A rotational axis of the polygonal mirror PM is set perpendicular to a rotational axis of the galvano-mirror GM, thereby sweeping the light beam in a two-dimensional direction. Scanning driver 12b rotates the polygonal mirror PM at fixed speed and adjusts the angular position of the polygonal mirror PM, based upon signals generated by the scanning control unit 13 according to timing signals generated by timing generator 15 shown in FIG. 3.

It is preferable to use the polygonal mirror PM for horizontal scanning and the galvano-mirror GM for vertical scanning because rotational speed of the polygonal mirror PM generally needs to be faster than the same of the galvano-mirror GM. Therefore, the galvano-mirror GM is made to rotate about an horizontal axis, and the polygonal mirror PM is made to rotate about a vertical axis. If a targeted vertical resolving power of the object information measuring device 10 is n, then the light beam has to be swept horizontally n times by the polygonal mirror PM while the galvano-mirror GM sweeps the light beam vertically in a first half of a vertical scanning cycle.

If a targeted horizontal resolving power of the object information measuring device 10 is m, then the sampling for measuring an object distance has to be performed m times every horizontal scanning period. For example, to obtain 600×400 resolution power, the sampling has to be performed at least once every 4.2 $\mu$ seconds without consideration of the returning time of scanning or blanking time. Actually, in consideration of the returning time of scanning or blanking time, the sampling interval of 4.2 $\mu$ seconds decreases by about 30.

A magnification of the first relay optical system RS1 or the second relay optical system RS2 is determined from an aspect ratio of the scanning field to the scanning angle of the light beam. For example, when the polygonal mirror PM is a dodecahedron, a maximum scanning angle of the light beam is 60 degrees, and a rotational speed of the polygonal mirror PM is 400/12=33.3 rps, i.e. 2,000 rpm. In the case of the galvano-mirror GM, parameters are determined at certain liberty because the galvano-mirror GM is controlled through servo-control and a scanning angle of the galvano-mirror GM is not limited. However, if the scanning angle of the galvano-mirror GM is 40 degrees, then the magnification of the first relay optical system RS1 or the second relay optical system RS2 is 1×. If a scanning angle of the galvano-mirror GM is 60 degree, then the magnification of the first relay optical system RS1 or the second relay optical system RS2 is 1.5×.

In the optical system shown in FIG. 4, the position of the light beam that reaches on the light-receiving element DET is not affected by a rotational position of the galvano-mirror GM or the polygonal mirror PM, but is determined by the object distance of the object OB. Thus, the light beam reflected from the object OB advances on the same optical path for the same object OB regardless of the rotational position of the scanning system, such as the galvano-mirror GM or the polygonal mirror PM. Therefore, the rotational position of the scanning system has nothing to do with measurement of the object distance, the projection light source LS or the light-receiving element DET.

Accordingly, the object distance to the object OB can be determined based upon the positional signal output by the light-receiving element DET. Thus, a method of obtaining the object distance with the object distance measuring device 1 is approximately the same as a method by an AF device applied to a camera, except for matters relating to the number of times of distance measurement or relating to the speed of processing.

Still referring to FIG. 4, the two-dimensional image of the object OB is formed as follows. After luminous flux emitted from the object OB passes through the objective lens OBL, the luminous flux is divided into two fluxes by a half mirror HM. One luminous flux is reflected by the half mirror HM and forms an image of the object OB on a first image plane, and the other luminous flux passes through half mirror HM. The image of the object OB formed on the first image plane is relayed through a relay lens L2 and a relay lens L3, and reaches an imaging device CCD, resulting in the formation of an image of the object OB on a surface of the imaging device CCD. Then, the imaging device CCD outputs an image signal regarding the object OB.

If depth of the field is made by setting a filter on the first image plane, or if a low pass filter is set on the first image plane, it is possible to obtain a good image of object OB. Furthermore, if the imaging device CD is set on the first image plane directly, it is possible to downsize the object information measuring device 10.

The above-described object distance data (i.e., three-dimensional information) and image data (i.e., two-dimensional information) are combined as follows. The luminous flux reflected by the half mirror HM after the objective lens OBL, reaches and converges on the imaging device CCD that outputs the imaging signal. The image signal output from the imaging device CCD is read out as image data by a signal processing circuit CKT1, and is processed with image processing by the information-processing computer COM. Then the processed image data is stored into the, data-storage device DM.

Meanwhile, the light beam (luminous flux) that passes through the half mirror HM behind the objective lens OBL, reaches and converges on the light-receiving element DET that outputs the positional signal. The positional signal output from the light-receiving element DET is converted to object distance data by signal processing circuit CKT2, and the object distance data is further converted to compressed distance data by the information-processing computer COM. Object distance data is stored in the data-storing device DM and arranged in a specified position or a specified array. If arrangement of the elements in the scanning field (i.e., arrangement of measuring points of the object distance) is coincident with the arrangement of pixels in the imaging device CCD, and the object distance data is connected with the image data, then it is easy to correlate image information of each pixel in the imaging device CCD to object distance information of each measuring point in the scanning field. However, even if arrangement of the elements in the scanning field is not coincident with the arrangement of pixels in the imaging device CCD, by complementing and standardizing data with predetermined arithmetic process, it is possible that the image information of each pixel correlates to the object distance information of each measuring point.

Reference is next made to FIG. 5, depicted therein is a circuit diagram illustrating the circuit of signal processing circuit CKT2 shown in FIG. 4. FIG. 5(a) illustrates the driving circuit to drive the projection light source LS, FIG. 5(b) the circuit to process signals from light-receiving element DET. The projection light source LS and the light-receiving element DET corresponds to the distance-detecting unit 14 in FIG. 3.

Referring to FIG. 5(a), the projection light source LS (LED) is driven by a drive circuit which receives timing signals generated by timing generator 15 (shown and described with reference to FIG. 3) and flashes at an adequate interval. The circuit in FIG. 5(b) includes the light-receiving element DET, which is a PSD element, which detects the position at which the light beam impinges on the light-receiving element DET, a pair of amplifiers 22 that converts current output from the light-receiving element DET to voltage, a multiplexer 23 that receives signals output from the pair of amplifiers 22 and outputs switching them, a sample hold circuit 24 for giving stability to signal output from the multiplexer 23, and an analog-to-digital converter 25 that converts analog signal output from the sample hold circuit 24 to digital signals. Active terminals in FIG. 5(b) are terminals that receive signals to activate the circuit shown in FIG. 5(b).

Figure 6A:
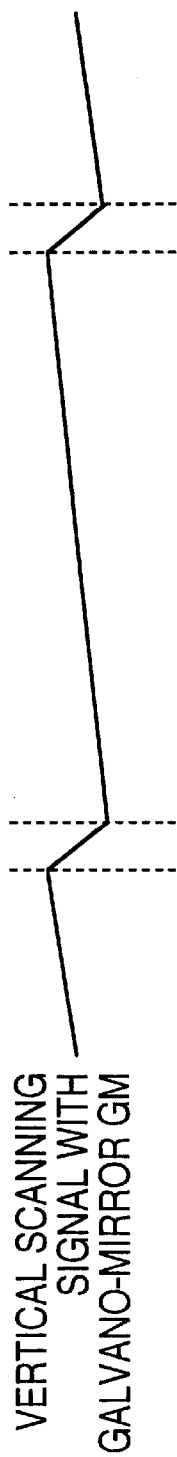
FIG.6 through FIG. 8 illustrate timing signal in vertical and horizontal scanning.
Figure 6B:
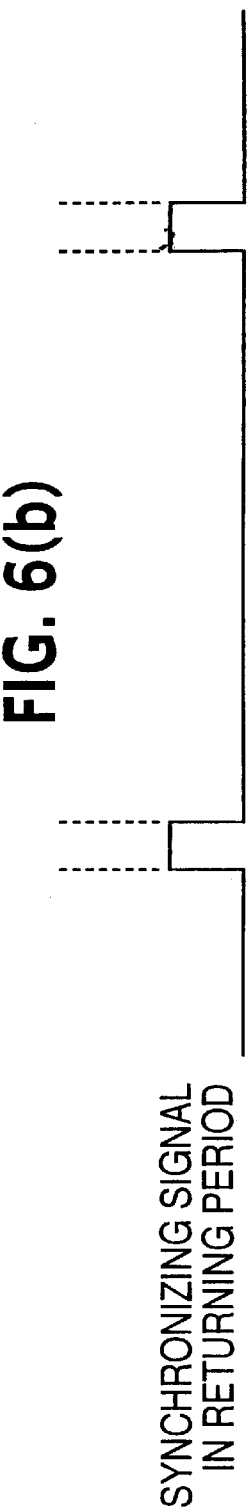
Figure 6C:

FIG. 6 through FIG. 8 illustrate in further detail timing of scanning and data obtaining. Referring to FIG. 6, three charts 6(a) through 6(c) illustrate timing relations in scanning operation. FIG. 6(a) illustrates a vertical scanning signal with regard to the galvano-mirror GM. The vertical scanning signal consists of two periods, one is scanning period, the other is returning period. The vertical scanning signal has a gradual slope in the scanning period and a steep slope in the returning period, repeating the same motion as a triangular wave. FIG. 6(b) illustrates a vertical synchronizing signal that indicates timing to start and end the scanning period and the returning period. The period when the vertical synchronizing signal is on corresponds to the above-mentioned returning period, in which scanning is not performed. FIG. 6(c) illustrates horizontal scanning signal with regard to the polygonal mirror PM. In the scanning period of the vertical scanning signal, there are n cycles of a horizontal scanning signal.

If it is set to sweep one frame in one second, then the vertical scanning period of the galvano-mirror GM equals one second approximately, permitting the galvano-mirror GM to rotate considerably slowly. The scanning control unit 13 transmits analog-servo signals to the scanning driver unit 12 based upon timing signal output from timing generator 15, shown with reference to FIG. 3. The scanning driver 12a drives the galvano-mirror GM in a manner of plotting a triangular waveform as shown in FIG, 6(a).

On the other hand, the servo-control scanning can not be applied to the horizontal scanning because the horizontal scanning is performed by rotating the polygonal mirror PM at a fixed speed. Instead, accurate control of the horizontal scanning can be achieved by dividing the vertical synchronizing signal shown in FIG. 6(b) into n+x (where x corresponds to a loss in the returning period) and controlling the rotation of the polygonal mirror PM through PLL control. In this case, if the rotation of the polygonal mirror is monitored by a newly added light beam that is projected to the polygonal mirror PM, precision rotation can be controlled at will. Furthermore, if the distance between a rotational axis of the polygonal mirror PM and a peripheral surface of each mirror is detected by a photo-interrupter, the precision control can also be achieved.

Furthermore, instead of using the polygonal mirror PM, use of a photo-acoustic element makes it possible to sweep the light beam without rotating the polygonal mirror PM at a fixed speed. The photo-acoustic element has an advantage of avoiding harmful noise or oscillation. However, when a photo-acoustic element is used, a laser light source must be used as the projection light source LS because the projection light source LS must have a single wavelength. Furthermore, using a photo-acoustic element requires a high power lens in the first relay optical system RS1. Because range of the scanning angle is narrower, the high power lens must be used to compensate for the narrower range of the scanning angle. However, the use of the laser light source and high power lens raises the cost to make a distance-measuring device. Therefore, it is desirable to use either the polygonal mirror or the photo-acoustic element based upon the purpose.

Referring now to FIG. 7, a manner to obtain the object distance using the data input unit 16 is explained. In particular, FIG. 7 shows four charts 7(a) through 7(d) that illustrate relations between a horizontal scanning signal and object distance data according to a preferred embodiment of the present invention. FIG. 7(a) illustrates a horizontal scanning signal with regard to the polygonal mirror PM. FIG. 7(b) illustrates a horizontal synchronizing signal that indicates timing to start and end horizontal scanning operation. The period when the horizontal synchronizing signal is ON corresponds to returning period.

If the number of object distance data points per one horizontal scanning is m, sampling for measuring an object distance has to be performed m times every horizontal scanning period. In the case of "active method" of measuring distance like the present embodiment, it is desirable that the projection light source LS is flashed periodically so that the projection light can be distinguished from disturbance light in the object field. In this case, measurement of the object distance is performed in both the ON period and the OFF period of the projection light source LS, and the object distance data is obtained based upon difference between measured values of the light beam reflected from the object in the ON period and the OFF period.

Figure 7A:
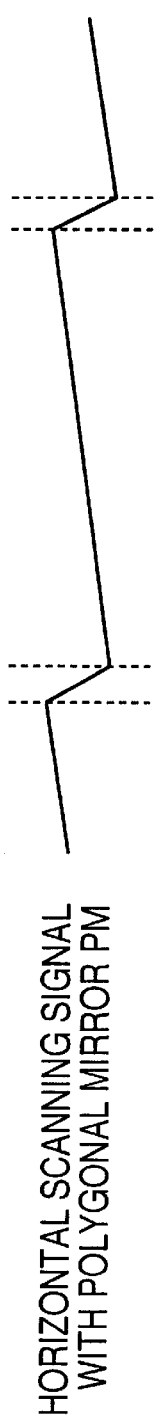
Figure 7B:
Figure 7C:
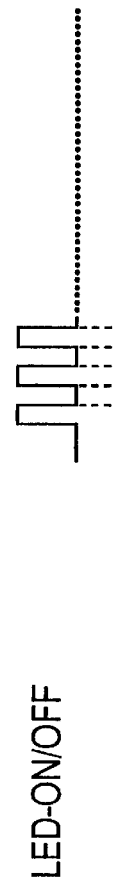
Figure 7D:

For this purpose, the projection light source LS flashes m times per a horizontal scanning as shown in FIG. 7(c). The analog-to-digital converter 25 in FIG. 5 converts signal at timing as shown in FIG. 7(d), so that signal output from the light-receiving element DET is data-held in both ON period and OFF period of the projection light source LS, and then is a/d-converted (i.e., analog-to-digital).

FIGS. 8(a) through 8(e) illustrate timing of signals in further detail. FIG. 8(a), FIG. 8(b), FIG. 8(c), FIG. 8(d), and FIG. 8(e) illustrate an amplified signal of the light receiving element DET by the amplifier 22, a timing signal for time-sharing by the multiplexer 23, a timing signal for the sample hold circuit 24, a timing signal for the analog-to-digital converter 25, and an output data signal from the analog-to-digital converter 25, respectively.

Figure 8A:
Figure 8B:
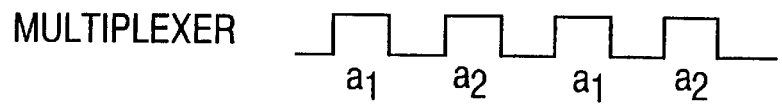
Figure 8C:
Figure 8D:
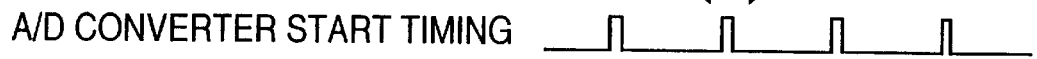
Figure 8E:
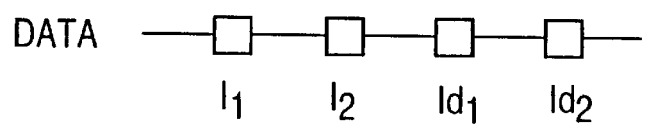

The signal output from the light-receiving element DET is amplified by the amplifier 22, and the amplifier 22 outputs the signal shown in FIG. 8(a). Then, the signal output from the amplifier 22 is time-shared by the multiplexer 23 according to timing of FIG. 8(b), and is transferred to the sample hold circuit 24. The sample hold circuit 24 processes the signal output from the multiplexer 23 and outputs the signal to the analog-to-digital converter 25. Then, the analog-to-digital converter 25 converts the signal to digital data according to the timing shown in FIG. 8(d). FIG. 8(e) illustrates object distance data that is output by the analog-to-digital converter 25. The signal output from the analog-to-digital converter 25 is transferred to the information-processing computer COM, and the information-processing computer COM calculates the actual object distance. As a result, the information-processing computer COM calculates the actual object distance based upon information regarding a position on the surface of the light-receiving element DET at which the light beam impinges on. While one measurement of object distance is performed, the projection light source LS flashes at least once, and the analog-to-digital converter 25 converts the signal at least four times. The analog-to-digital converter 25, therefore, has to convert signals at least at approximately 1 MHz.

Processing of object distance data by the information-processing computer COM is next explained. The information-processing computer COM calculates a positional value of a point X on the surface of the light-receiving element DET at which the light beam impinges on. If a pair of currents are output from the analog-to-digital converter 25, which corresponds to currents when the light-receiving element DET is ON, are $I_1$ and $I_2$, then the positional value of the point X is given by x in the next equation (1):

$$x = \frac{l_1 + l_2}{l_1 - l_2} \qquad \text{equation (1)}$$

According to a preferred embodiment of the present invention, influence of the disturbance light is avoidable as described above. Then, if a pair of currents are output from the analog-to-digital converter 25 which corresponds to currents when the light receiving element DET is OFF, are $Id_1$ and $Id_2$, then the positional value of the point X is given by x in the next equation (2).

Then, the information-processing computer COM converts the Positional value of the point X to the object distance for the point on the object OB at which the object distance is measured. The object distance is stored in the data-storing device DM.

$$x = \frac{l_1 - ld_1 - l_2 + ld_2}{l_1 + l_2 - ld_1 - ld_2} \qquad \text{equation (2)}$$

And then, the information-processing computer COM compresses the object distance data, which is stored in the data-storing device DM in order to enable the relief-forming unit 42 to form the relief of the object image. If the limit of the maximum height of the relief is 1 mm, then the object in real field has to be converted to a relief in height of not more than 1 mm. As described later, a relief formed by the method using blister ink limits the maximum height to 1 mm. In this case, therefore, the object distance data has to be compressed so as to form the relief in height not more, than 1 mm. However, a simple proportional compression does not produce a good result as explained below.

In this case, if the farthest object distance is 5 m in the object field and a person whose has a nose depth of 3 mm stands in the foreground, then the relief height of his nose becomes only 6 $\mu$m according to simple proportional compression. A relief height of 6 $\mu$m makes it difficult to distinguish the shape of the nose. As the farthest object distance becomes larger than 5 m, for example 10 m or 20 m, the relief height decreases more and more and becomes substantially undistinguishable.

To avoid such a state, the compression ratio of the object distance in the foreground must be larger than the same in background. For this purpose, for example, the compression ratio of the object distance must be expressed by the next equation (3):

$$y = \frac{a}{x} \qquad \text{equation (3)}$$

Where y is compression ratio of the object distance, a is constant, and x is a distance from the objective lens OBL to the object.

More specifically, if y is the roughness of the relief at the position X, y is expressed using equation (3) by the next equation (4):

Where Df is the maximum object distance, Dn is the minimum object distance, and h is the maximum roughness of the relief.

If Dn is, for example, 1 m, Df is 5 m, x is 1 m, and h is 1 mm, then y is 36 $\mu$m corresponding to an object roughness of 3 cm. When the object roughness is 10 cm at minimum object distance, y is 114 $\mu$m. This roughness of the relief is a distinguishable roughness.

Furthermore, the compressed distance data as described above can be processed into new distance data. If compressed distance data having an arrangement of m×n elements is stored, then new distance data can be processed based upon data composed of the above element and its surrounding elements.

More specifically, when $a_{ij}$ is compressed distance data having arrangement of i×j elements, the new distance data $b_{ij}$ is processed by equation (5). In equation (5), for example, an element and its surrounding elements composing 3×3 elements or 5×5 elements are combined linearly. The new distance data is always calculated based upon original compressed distance data and is not calculated based upon distance data calculated previously.

$$b_{ij} = \Sigma I_{ij} * a_{ij} \qquad \text{equation (5)}$$

$I_{ij}$ is a coefficient regarding linear combination. Equation (5) is commonly expressed as form of determinant like equation (6) composing a two-dimensional arrangement of elements.

$$\begin{array}{ccc} I_{11} & I_{21} & I_{31} \\ I_{12} & I_{22} & I_{32} \\ I_{13} & I_{23} & I_{33} \end{array} \qquad \text{equation (6)}$$

Where $I_{22}$ is a coefficient relating data of the center pixel, $I_{21}$ is a coefficient relating data of the upper pixel of the center pixel and $I_{23}$ is a coefficient relating data f the lower pixel of the center pixel.

In an edge area of an image, some coefficients in equation (5) are not used because there are not sufficient surrounding elements. In this case, data has an arrangement of (m−2)× (n=2) elements.

Suppose object distance data is expressed by equation (7). Calculating compressed distance data using coefficients of the equation (7), new compressed data is calculated based upon the difference between the present coefficient and the next coefficient. Therefore, if spatial frequency is high in an area where the calculation is performed, then the new compressed data emphasizes detail of the relief configuration. Accordingly, an object area where object distance varies rapidly is emphasized and configuration of a relief is formed emphatically.

$$\begin{array}{ccc} 0 & 1/4 & 0 \\ -1/4 & 2 & -1/4 \\ 0 & 1/4 & 0 \end{array} \qquad \text{equation (7)}$$

$$\begin{array}{ccc} -1 & -1 & -1 \\ -1 & 10 & -1 \\ -1 & -1 & -1 \end{array} \qquad \text{equation (8)}$$

Equation (8) has also the same effect as equation (7). When the determinant (8) is expanded, if each element of the determinant is corresponded to a pixel, it is substantially the same as a Fourier transform. Accordingly, arbitrary frequency components can be emphasized as well as the Fourier transform. When human vision recognizes an object in the human brain, recognition of the object image depends on a density of information. Therefore, brightness of the object image is sometimes perceived or detail of the object image is sometimes emphasized. Although this process of the recognition is not always same, generally, an object having high spatial frequency is recognized emphatically, and an object of low spatial frequency is recognized with less reality. The previously mentioned processing of distance data is the same as the conduct of recognition in a human brain. Therefore, even though the maximum height of the relief configuration is limited, the relief can be seen with reality. Furthermore, the above determinant can be regarded as an optical low-pass filter. By treating the determinant as an optical low-pass filter, noise included in the object distance data can be removed.

The information-processing computer COM combines image data and compressed distance data as a data set, and stores the data set into the data-storing device DM. And, the information-processing computer COM transmits the data set to the printer 4 as printing data. When the image data is combined with the compressed distance data, the number of elements in a scanning area is accorded with the number of pixels of the light-receiving element DET, correlating their address. Thus, combined data of the image data and the compressed distance data' is produced for forming a three-dimensional image.

The printing material on which the printer 4 prints image and forms relief configuration is now explained.

Figure 9A:
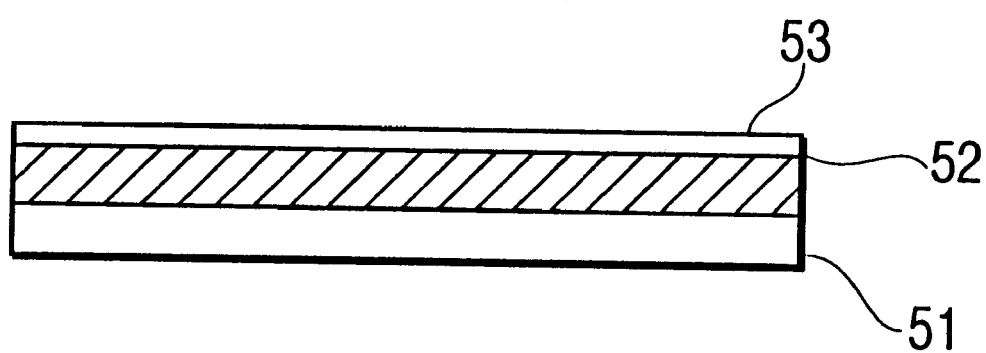
FIG. 9 illustrates a cross-sectional view of the printing material.
Figure 9B:
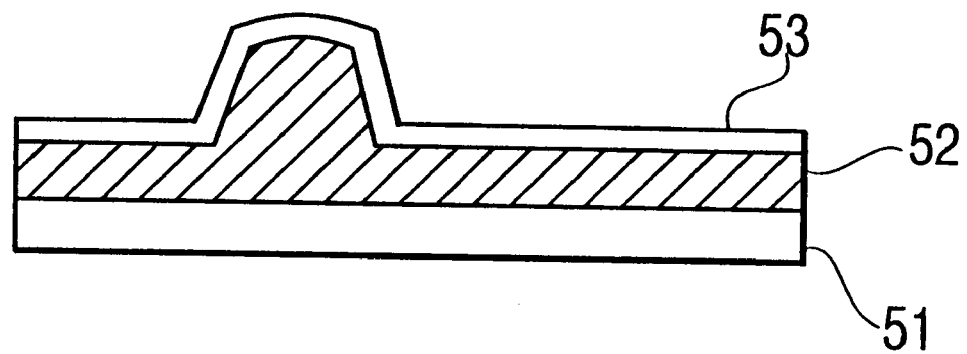

FIG. 9 illustrates a cross-sectional view of the printing material. Referring now to FIG. 9(a), a blister ink layer 52 is almost uniformly coated on a substrate 51 such as paper or plastic. The blister ink blisters mainly through the addition of heat and forms a height of the relief configuration according to the quantity of added heat. A thin printing layer 53 of printing surface is coated on the blister ink layer 52. It is desirable that the printing layer 53 possesses a sufficient elasticity so as not to rupture when the blister ink blisters. For example, plastic or coating paper is preferred as the printing layer 53.

When heat is applied to some point of the blister ink layer 52, the blister ink at that point blisters and a certain height of relief configuration is formed according to quantity of added heat. The printing material is swept by a laser beam receiving heat in the printer 4, as in a laser printer, and the blister ink at the heated point blisters. Then, a desired height of relief configuration is formed at the heated point, according to the quantity of added heat, as shown with reference to FIG. 9(b). On the other hand, it is possible to use a type of blister ink that has been already blistered and shrinks by heating. When using such a blister ink, a point that will form a recess is heated by the laser beam in a printer 4, as is described later.

Figure 10:
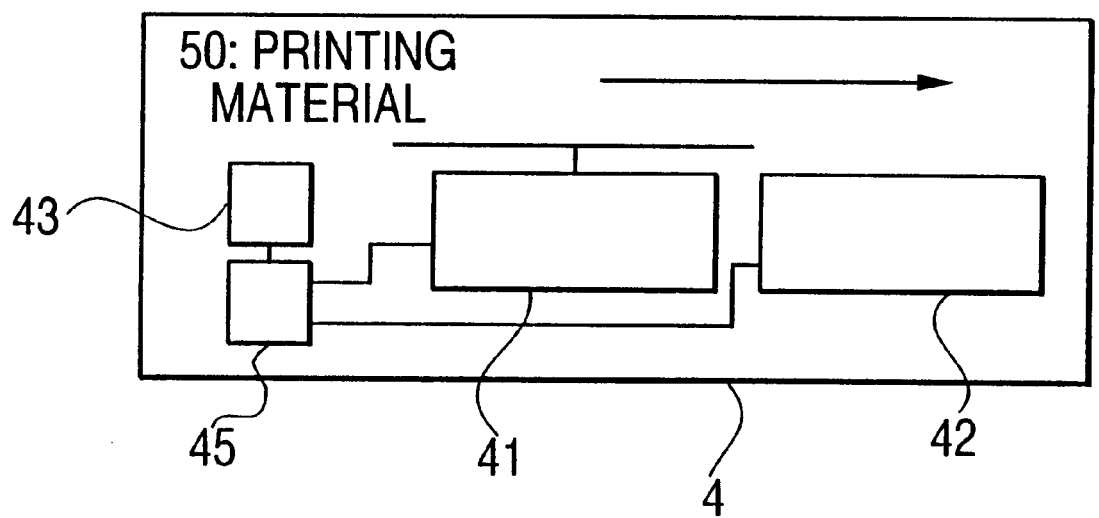
FIG. 10 is a block diagram of the printer 4 shown in FIG. 3.
Figure 11:
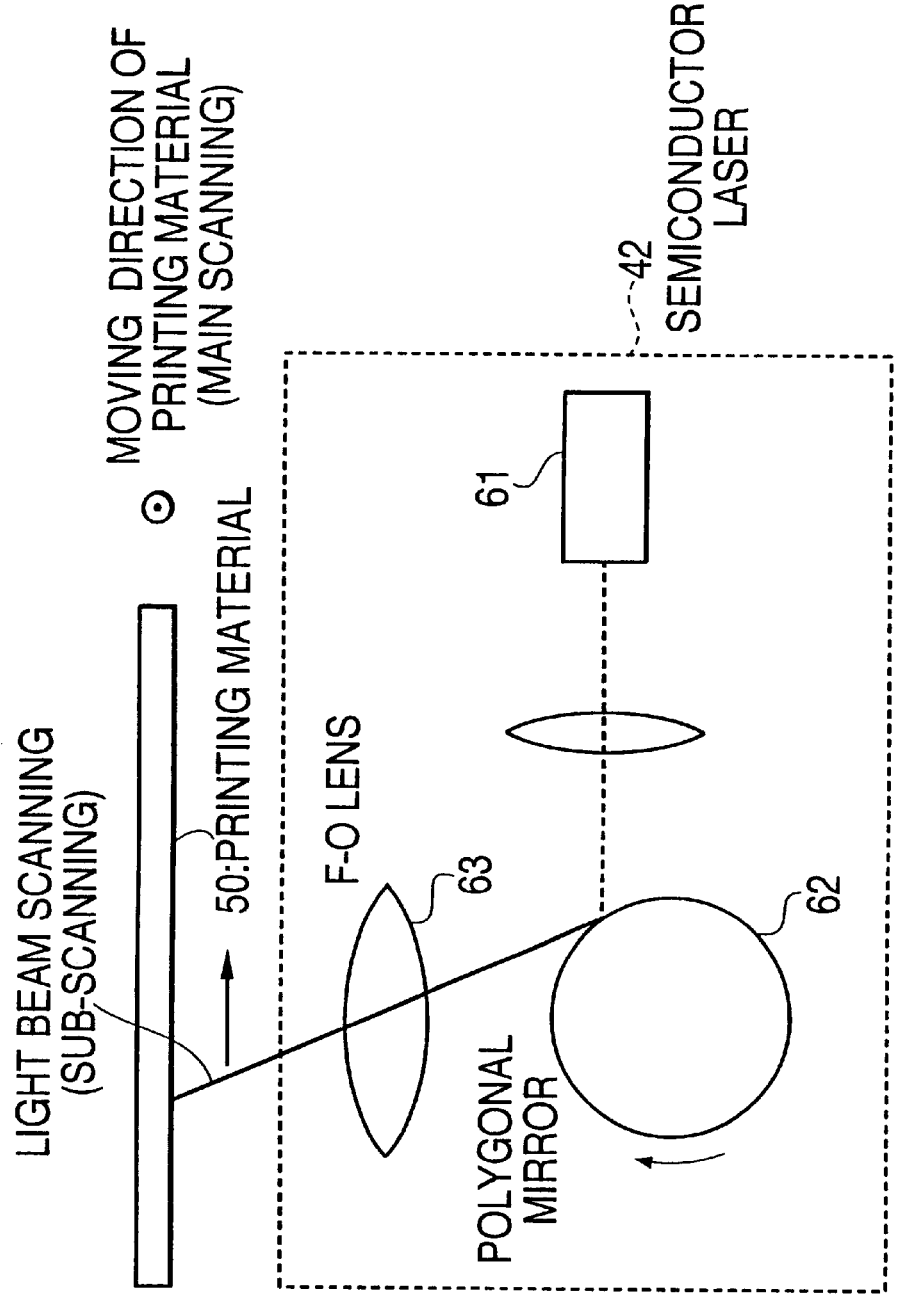
FIG. 11 is a schematic view of a relief-forming unit 42 shown in FIG. 3.

FIG. 10 is a block diagram of the printer 4. FIG. 11 is a schematic view of relief forming unit 42. Referring now to FIG. 10, the printer 4 includes the printer unit 41 that prints a two-dimensional image onto the printing layer 53 of the printing material 50, the relief-forming unit 42 that forms a relief configuration by blistering the blister ink, a feeding device 43 that feeds the printing material 50 through the printing unit 41 and the relief-forming unit 42, and a print control device 45 that controls the printing unit 41, the relief-forming unit 42 and the feeding device 43.

In the printer 4, the print control device 45 receives the image data as printing data from the data-storing device DM, along with the information-processing computer COM. The printing unit 41 prints a color image or a black and white image on the printing material 50 based upon the number printing data of pixels (m×n). As to the printing process, an ink jet printing process is preferred to a heat-sensitive printing process, because in a heat-sensitive printing process there may be a problem with the heat used for blistering the blister ink affecting heat-sensitive paper.

The print control device 45 receives the compressed distance data as the roughness data from the data-storage device DM, along with the information-processing computer COM. The relief-forming unit 42 forms a relief configuration, superimposing the relief configuration onto the above-mentioned printed image based upon the relief data corresponding to pixels (m×n). Thus, a printing image is performed prior to forming a relief configuration. The reason that a printing image is performed first is because it is difficult to print the image on the relief surface.

One example of the printing unit 41 is shown in FIG. 10, wherein the printing unit 41 and the relief-forming unit 42 are incorporated into the printer 4 and are arranged close to each other so that the printing material 50 is easily transferred from the printing unit 41 to the relief-forming unit 42, or vice versa. However, by separating the relief-forming unit 42 from the printer 4, they can be independent each other functionally and physically. As such, it is possible that after a common printing machine prints images on a printing material such as the printing material 50, the sole relief-forming unit 42 forms a relief configuration on the printing material.

FIG. 11 is a schematic view illustrating a relief-forming unit 42. The relief-forming unit 42 includes a semiconductor laser 61 that heats the blister ink in the blister ink layer 52 on printing material 50 to blister the blister ink, a polygonal mirror 62 that sweeps a laser beam in a direction (sub scanning direction) perpendicular to a direction (main scanning direction) of feeding the printing material 50, lens that that makes a laser beam converge on the printing material 50.

The laser beam from the semiconductor laser 61 is reflected by the polygonal mirror 62, and then is converged on the printing material 50 by the f-Θ lens 63. The polygonal mirror rotates to sweep the laser beam for sub-scanning. In sub-scanning, the laser beam is swept from left to right on the printing material 50, and returned from right to left on the same, repeating this cycle, as shown with reference to FIG. 11. Each sub-scanning of the laser beam produces a strip of relief configuration on the printing material 50.

After completion of a sub-scanning, the relief-forming unit 42 feeds the printing material 50 by a width of one scanning in the direction of main scanning, and then the next sub-scanning begins. Each sub-scanning includes m points at which a relief configuration is performed. If sub-scanning is repeated n times, one scanning field includes the points (m×n), thereby forming a relief configuration imposed on the image picture.

In accordance with the present invention described herein, a three-dimensional image making apparatus prints an image picture and forms a relief configuration imposed on the image picture, on the printing material 50. That is, a picture of real three-dimensional configuration is produced on the printing material 50, unlike conventional stereo-photography or holography. Accordingly, it is possible to perceive a real three-dimensional picture regardless of a viewing direction or a lighting direction. Therefore, it is possible to produce a real three-dimensional image easily, and at the same time, to enjoy an essential feature of photographic pictures.

Furthermore, in accordance with the embodiments of the present invention, the maximum height of the relief configuration is not so high as with a conventional photographic picture.

Figure 12:
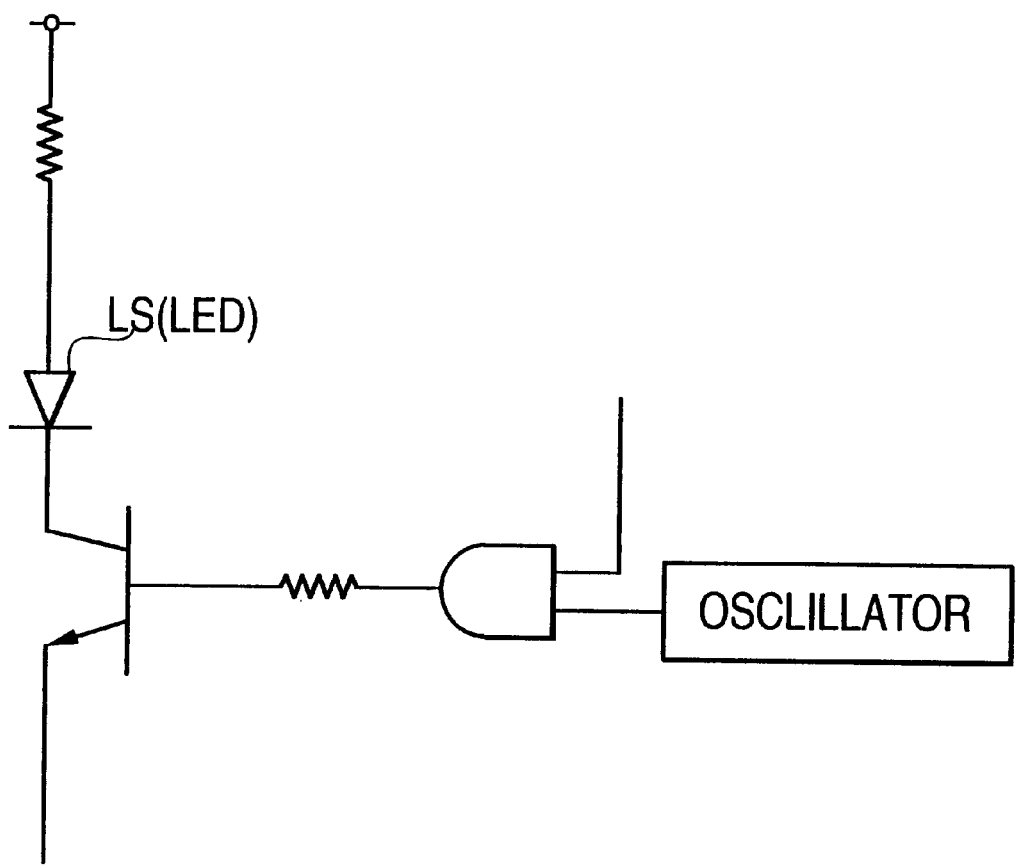
FIG. 12 illustrates a circuit that is used instead of a circuit shown in FIG. 5($a$)
Figure 13:
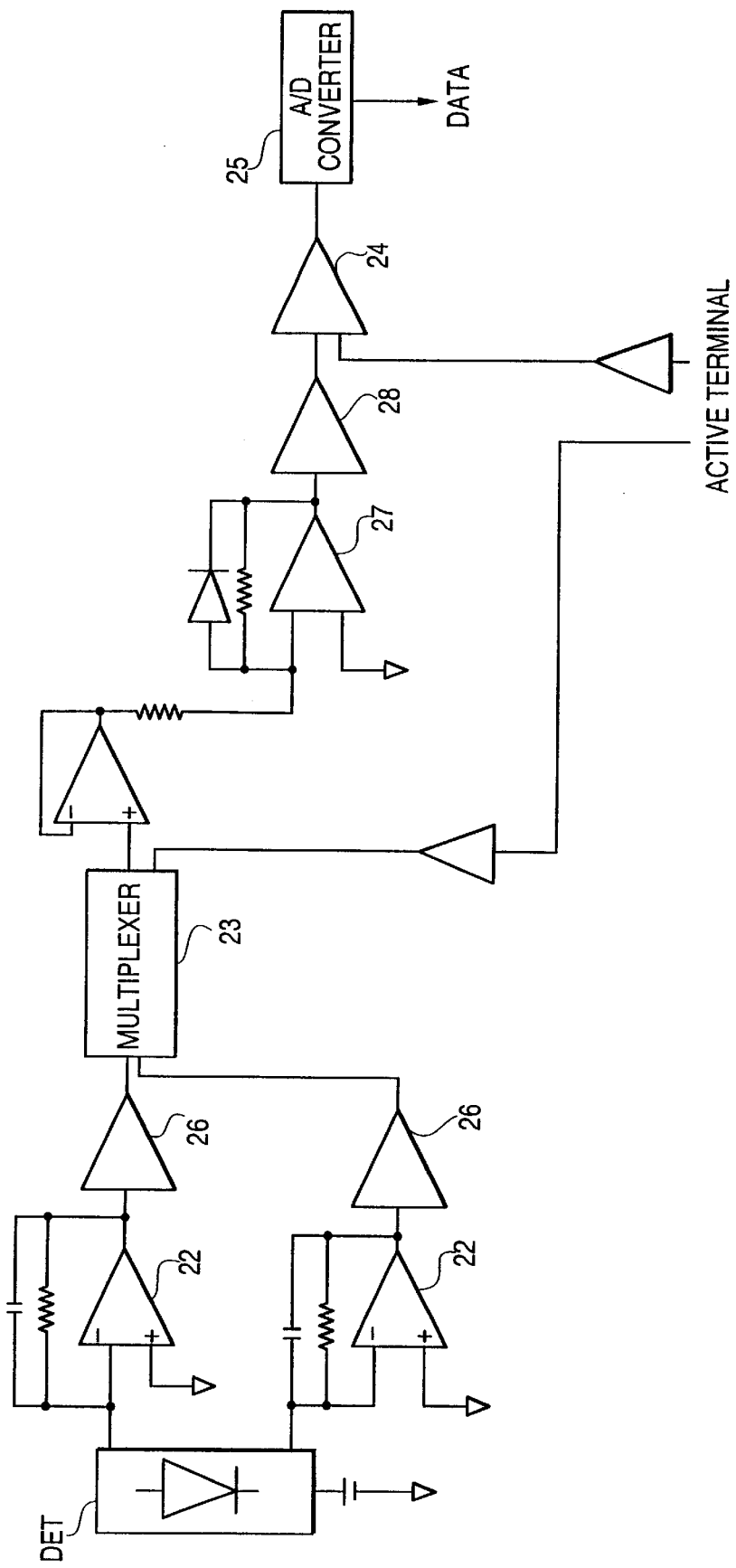
FIG.13 illustrates a circuit that is used instead of a circuit shown in FIG. 5($b$).

FIG. 12 illustrates a circuit that can be used instead of the circuit shown in FIG. 5(a). FIG. 13 illustrates a circuit that can be used instead of a circuit shown in FIG. 5(b). The circuit shown in FIG. 12 is a circuit that addresses matters when the processing rate of the analog-to-digital converter 25 is a problem. The circuit shown in FIG. 12 modulates light from the projection light source LS by using an oscillator having a specific frequency.

In this case, as shown in FIG. 13, a band-pass filter 26 is placed between the amplifier 22 and the multiplexer 23. The band-pass filter 26 filters out signals having the same frequency as the projection light source LS from the signal output by the amplifier 22. Furthermore, a band-pass filter 27, which filters out a frequency corresponding to an oscillating frequency of the oscillator shown in FIG. 12 and rectifies it, and a low-pass filter 28, which filters out carrier-frequency from the signal output by the band-pass filter 27 and smoothes it, are placed between the multiplexer 23 and the sample and hold circuit 24.

In the oscillator shown in FIG. 12, when a very rare frequency in nature is used as an oscillating frequency, the disturbance light or direct-current component in nature can be removed without performing ON-OFF operations of the projection light source LS. In such a case, the position of the point X can be calculated from equation (1). By performing an a/d-conversion of $I_1$ and $I_2$ twice, a set of object distance data can be obtained. Therefore, data quantity for obtaining the object distance can be reduced to half.

Thus, when a very rare frequency in nature is used as an oscillating frequency of the oscillator, it is effective to sample data at a high speed or to increase the scanning density. Furthermore, it can also be effective to sample stable and accurate object distance data when the data quantity is increased.

However, if a LED element is used as the projection light source LS, a transient build-up characteristic approximately at frequency of 1 MHz may deteriorate. In this case, a LD element should be used instead of the LED element.

In accordance with embodiments of the present invention, image information on an object is obtained and object distance information within a predetermined angle of view is obtained by sweeping a light beam two-dimensionally using a method, such as the Active Method of auto focussing art. It is possible to produce, a three-dimensional image easily by imposing a relief configuration, which is formed onto an image picture that is printed based upon the image information, based upon the object distance information.

Furthermore, in accordance with embodiments of the present invention, by compressing object distance information corresponding to object distance and by forming a relief configuration based upon the compressed object distance information, a three-dimensional image making apparatus can produce a real three-dimensional image onto a portable, recording medium.

Furthermore, in accordance with embodiments of the present invention, by emphasizing a relief configuration according to a spatial frequency relating to the object distance information, a three-dimensional image making apparatus can form a more real three-dimensional image.

Furthermore, in accordance with embodiments of the present invention, by increasing emphasis of the relief configuration with increasing spatial frequency relating to the object distance information, a three-dimensional image making apparatus can form a three-dimensional image that is perceived with more reality.

Furthermore, in accordance with embodiments of the present invention, a portable recording medium, on which three-dimensional image is produced, includes a printing material layer, a blister ink layer to be blistered by heat or light to form a relief configuration, and a substrate layer, with three layers piled up in turn. By this configuration, it is possible to perceive a real three-dimensional picture regardless of a viewing direction or a lighting direction and also to enjoy features of a conventional photographic picture.

Furthermore, in accordance with embodiments of the present invention, the three-dimensional image making apparatus includes the information-processing device and the printer that forms relief configuration imposed on a printed image on the printing material. Accordingly, it is possible to form a three-dimensional image on the portable recording medium.

Furthermore, in accordance with embodiments of the present invention, the three-dimensional image making apparatus includes the printing device and the relief-forming device independently, the printing device printing an image picture, the relief-forming device forming relief configuration. Accordingly, it is possible, that after a common printing machine prints an image picture on the printing material, the, relief-forming device forms a relief configuration.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. A three-dimensional image making apparatus for forming a relief configuration image of an object, comprising:

an image input device configured to obtain image information of said object;

an object distance processing device configured to obtain object distance information of said object;

a printer configured to print an object image of said object and to form a relief configuration of said object; and an information-processing device configured to control said printer to print said object image based upon said image information, and to form said relief configuration superimposed on said object image based upon said object distance information.

2. The three-dimensional image making apparatus according to claim 1, wherein said information-processing device is further configured to compress said object distance information such that a compression rate of the object distance information is increased as the object distance increases, and to control said printer to form said relief configuration based upon said compressed object distance information.

3. The three-dimensional image making apparatus according to claim 1, wherein said object image is divided into pixels and said object distance processing device obtains the object distance information relating to an object distance at each pixel of said object image, and said information-processing device is further configured to process said object distance information for each pixel so that said relief configuration is emphasized according to a spatial frequency at said each pixel, and to control said printer to form said relief configuration based upon said processed object distance information.

4. The three-dimensional image making apparatus according to claim 1, wherein said object image is divided into pixels and said information-processing device is further configured to process said object distance information at each pixel so that said relief configuration is emphasized according to a spatial frequency at said each pixel, and to control said printer to form said relief configuration based upon said processed object distance information.

5. A printing material, comprising:

a substrate layer;

a blister ink layer being blistered by applying light or heat, said blister ink layer forming a relief configuration according to quantity of applied light or heat; and a printing layer on which an image is printed, wherein said substrate layer, said blister ink layer and said printing layer are piled up in turn.

6. A printing material, comprising:

a substrate layer;

a blistered ink layer, which has already been blistered, being shrunk by applying light or heat, said blistered ink layer forming relief configuration according to a quantity of applied light or heat; and a printing layer on which an image is printed, wherein said substrate layer, said blistered ink layer and said printing layer are piled up in turn.

7. A three-dimensional image making apparatus according to claim 1, wherein said printer includes a device to print said image on said printing layer of claim 5 by blistering said blister ink layer of claim 5 through applying light or heat, and said information-processing device is further configured to control said printer to superimpose said relief configuration on said object image based upon said object distance information obtained by said object distance processing device.

8. A three-dimensional image making apparatus according to claim 1, wherein said printer includes a device to print said image on said printing layer of claim 6 by shrinking said blistered ink layer of claim 6 through applying light or heat, and said information-processing device is further configured to control said printer to superimpose said relief configuration on said object image based upon said object distance information obtained by said object distance processing device.

9. A three-dimensional image making apparatus according to claim 2, wherein said printer includes a device to print said image on said printing layer of claim 5 by blistering said blister ink layer of claim 5 through applying light or heat, and said information-processing device is further configured to control said printer to superimpose said relief configuration on said object image based upon said object distance information obtained by said object distance processing device.

10. A three-dimensional image making apparatus according to claim 2, wherein said printer includes a device to print said image on said printing layer of claim 6 by shrinking said blistered ink layer of claim 6 through applying light or heat, and said information-processing device is further configured to control said printer to superimpose said relief configuration on said object image based upon said object distance information obtained by said object distance processing device.

11. A three-dimensional image making apparatus according to claim 3, wherein said printer includes a device to print said image on said printing layer of claim 5 by blistering said blister ink layer of claim 5 through applying light or heat, and said information-processing device is further configured to control said printer to superimpose said relief configuration on said object image based upon said object distance information obtained by said object distance processing device.

12. A three-dimensional image making apparatus according to claim 3, wherein said printer includes a device to print said image on said printing layer of claim 6 by shrinking said blistered ink layer of claim 6 through applying light or heat, and said information-processing device is further configured to control said printer to superimpose said relief configuration on said object image based upon said object distance information obtained by said object distance processing device.

13. The three-dimensional image making apparatus according to claim 7, wherein said printer includes a printing device for printing an image and a relief-forming device for forming a relief configuration independently.

14. The three-dimensional image making apparatus according to claim 8, wherein said printer includes a printing device for printing an image and a relief-forming device for forming a relief configuration independently.

15. The three-dimensional image making apparatus according to claim 9, wherein said printer includes a printing device for printing an image and a relief-forming device for forming a relief configuration independently.

16. The three-dimensional image making apparatus according to claim 9, wherein said printer includes a printing device for printing an image and a relief-forming device for forming a relief configuration independently.

17. The three-dimensional image making apparatus according to claim 10, wherein said printer includes a printing device for printing an image and a relief-forming device for forming a relief configuration independently.

18. The three-dimensional image making apparatus according to claim 11, wherein said printer includes a printing device for printing an image and a relief-forming device for forming a relief configuration independently.

19. The three-dimensional image making apparatus according to claim 12, wherein said printer includes a printing device for printing an image and a relief-forming device for forming a relief configuration independently.

* * * * *